United States Patent
Kalman

(10) Patent No.: US 11,579,910 B2
(45) Date of Patent: Feb. 14, 2023

(54) POLICY ENFORCEMENT AND PERFORMANCE MONITORING AT SUB-LUN GRANULARITY

(71) Applicant: NetApp Inc., Sunnyvale, CA (US)

(72) Inventor: Dean Alan Kalman, Cary, NC (US)

(73) Assignee: NetApp, Inc., San Jose, CA (US)

( * ) Notice: Subject to any disclaimer, the term of this patent is extended or adjusted under 35 U.S.C. 154(b) by 482 days.

(21) Appl. No.: 16/576,860

(22) Filed: Sep. 20, 2019

(65) Prior Publication Data

US 2021/0089338 A1 Mar. 25, 2021

(51) Int. Cl.
| | |
|---|---|
| G06F 9/455 | (2018.01) |
| G06F 16/174 | (2019.01) |
| G06F 16/27 | (2019.01) |
| G06F 16/11 | (2019.01) |
| G06F 11/30 | (2006.01) |
| G06F 12/109 | (2016.01) |

(52) U.S. Cl.
CPC ........ *G06F 9/45558* (2013.01); *G06F 11/301* (2013.01); *G06F 11/3034* (2013.01); *G06F 11/3037* (2013.01); *G06F 11/3055* (2013.01); *G06F 12/109* (2013.01); *G06F 16/128* (2019.01); *G06F 16/1744* (2019.01); *G06F 16/1748* (2019.01); *G06F 16/273* (2019.01); *G06F 16/275* (2019.01); *G06F 11/3006* (2013.01); *G06F 2009/4557* (2013.01); *G06F 2009/45579* (2013.01); *G06F 2009/45583* (2013.01); *G06F 2009/45591* (2013.01); *G06F 2212/656* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 10,228,858 B1* | 3/2019 | Stoakes | G06F 3/0641 |
| 10,891,201 B1* | 1/2021 | Kozlovsky | G06F 11/1469 |
| 2003/0115447 A1* | 6/2003 | Pham | H04L 69/168 |
| | | | 713/153 |
| 2005/0091418 A1* | 4/2005 | Snover | G06F 9/45512 |
| | | | 710/1 |
| 2009/0287743 A1* | 11/2009 | Uppala | G06F 3/0634 |
| 2011/0314145 A1* | 12/2011 | Raleigh | H04L 43/0882 |
| | | | 709/224 |
| 2016/0202916 A1* | 7/2016 | Cui | G06F 3/065 |
| | | | 711/162 |
| 2017/0222935 A1* | 8/2017 | Kalman | G06F 3/0659 |

(Continued)

OTHER PUBLICATIONS

NetApp, "NetApp Custom MIB", 2017 (Year: 2017).*

*Primary Examiner* — Wynuel S Aquino
(74) *Attorney, Agent, or Firm* — Cooper Legal Group, LLC

(57) ABSTRACT

Techniques are provided for enforcing policies at a sub-logical unit number (LUN) granularity, such as at a virtual disk or virtual machine granularity. A block range of a virtual disk of a virtual machine stored within a LUN is identified. A quality of service policy object is assigned to the block range to create a quality of service workload object. A target block range targeted by an operation is identified. A quality of service policy of the quality of service policy object is enforced upon the operation using the quality of service workload object based upon the target block range being within the block range of the virtual disk.

20 Claims, 7 Drawing Sheets

(56) References Cited

U.S. PATENT DOCUMENTS

| | | | |
|---|---|---|---|
| 2018/0032409 A1* | 2/2018 | Surakanti | G06F 9/45558 |
| 2018/0048537 A1* | 2/2018 | Gaikwad | H04L 41/0896 |
| 2018/0121344 A1* | 5/2018 | Seo | G06F 12/0246 |
| 2019/0171580 A1* | 6/2019 | Suryanarayana | G06F 12/1009 |
| 2020/0050403 A1* | 2/2020 | Suri | G06F 3/0688 |
| 2021/0081235 A1* | 3/2021 | Goto | G06F 9/4818 |
| 2021/0081326 A1* | 3/2021 | Curewitz | G06F 12/0284 |

* cited by examiner

POLICY ENFORCEMENT AND PERFORMANCE MONITORING AT SUB-LUN GRANULARITY

BACKGROUND

A virtualization environment can be used to host and manage virtual machines. A virtual machine stores an operating system, application data, and/or user data within virtual disks. The virtualization environment may store the virtual disks of the virtual machines hosted by the virtualization environment within logical unit numbers (LUNs), such as within a storage area network (SAN). For example, the virtualization environment may host a file system within a LUN. The virtualization environment may store the virtual disks as files within the file system hosted by the virtualization environment. Unfortunately, the virtualization environment may expose little to no virtual machine information, such as to a separate service such as a storage service, which could otherwise be used to manage and provide additional functionality for the virtual machines and/or virtual disks. For example, the storage service may be capable of enforcing a policy, such as a quality of service (QoS) policy, for the LUN, but would be unable to enforce the policy at sub-LUN granularity such as a virtual machine or virtual disk granularity due to the lack of access to the virtual machine information from the virtualization environment. If a quality of service policy is applied to merely the LUN, then all virtual machines having virtual disks stored within the LUN would be assigned to that same quality of service policy. In many instances, this is undesirable because the virtualization environment may store virtual machines of different clients that have subscribed to different levels of quality of service policies within the same LUN.

DETAILED DESCRIPTION

Figure 1:
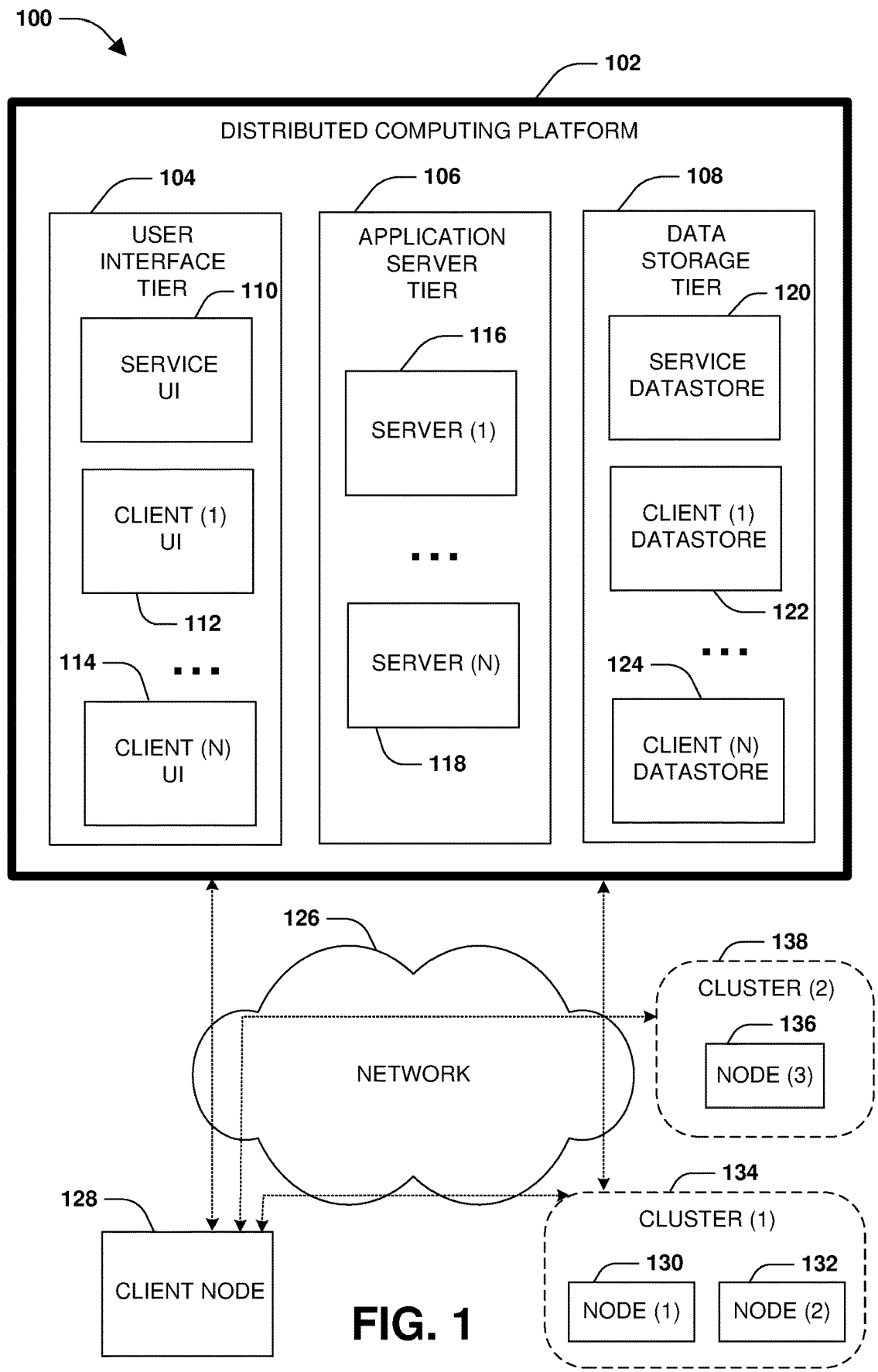
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

Clients of a storage service may subscribe to certain amounts of processing resources, performance and throughput (e.g., a minimum and maximum number of operations per second), storage resources, an amount of redundancy, security, bandwidth, and/or other guarantees. The storage service can enforce such performance and resource guarantees using policies, such as a quality of service policy. The quality of service policy is used to ensure that adequate resources (e.g., storage resources, nodes, hardware or software resources, etc.) are allocated so that performance, throughput, storage, processing resources, and other guarantees subscribed to by a client are met.

Within certain computing environments, such as network attached storage (NAS) environment, a quality of service policy can be specified at various levels of granularity. This is because files within the network attached storage environment can be easily identified, accessed, and managed by the storage service (e.g., by a node). Thus, a quality of service policy can be applied on any of these files, and performance of the files can be monitored to ensure that the quality of service policy is being met. Thus, the quality of service policy can be applied at a file level granularity. For example, a file may comprise a virtual disk of a virtual machine. Because the file and information about the file is easily accessible within the network attached storage environment to the storage service, a quality of service policy of the virtual machine and/or virtual disk can easily be attached to that file.

Unfortunately, it is difficult or impossible to attach policies to virtual machines and/or virtual disks of virtual machines within other types of storage environments, such as a virtualization environment. In particular, the virtualization environment creates a file system over a logical unit number (LUN). The virtualization environment is configured to host virtual machines having virtual disks that are stored within the file system over the LUN. The virtualization environment does not natively provide quality of service guarantees and monitoring. However, a service such as the storage service that is capable of providing quality of service guarantees and monitoring is unable to provide such for virtual machines and virtual disks managed by the virtualization environment because the virtualization environment does not provide virtual machine and virtual disk information to the storage service that would be needed for enforcing and monitoring policies upon virtual disks within the file system. The storage service may be able to enforce and monitor a policy upon the entire LUN but is unable to do the same at a sub-LUN granularity such as at a virtual disk or virtual machine granularity due to the lack of information exposed by the virtual environment to the storage service.

Accordingly, as provided herein, enforcement of a policy such as a quality of service policy and performance monitoring can be performed at a sub-LUN granularity by a storage service such as at a virtual machine granularity and/or a virtual disk granularity of virtual machines managed by a virtualization environment that is separate from the storage service. For example, a quality of service policy is to be enforced for a virtual disk of a virtual machine hosted by the virtualization environment. The virtual disk is stored through a file system hosted by the virtualization environment for a LUN. Accordingly, a block range of the virtual disk stored within the LUN is identified. For example, a management tier of the virtualization environment hosting the virtual machine and storing the virtual disk within the LUN may provide the block range at which the virtual disk is stored within storage managed by the storage service. In this way, the quality of service policy can be assigned for the block range of the LUN by assigning a quality of service policy object, managed by the storage service, to the block range of the virtual disk to create a quality of service workload object managed by the storage service. The virtual disk block range may be continuous or non-continuous.

When the storage service receives an I/O operation (e.g., a storage operating system of a node of the storage service hosting storage devices within which the virtual disks and virtual machines are stored), the operation is evaluated to identify a target block range (e.g., a logical block address) targeted by the operation. Accordingly, if the target block range is within the block range of the virtual disk (e.g., the operation is directed to the virtual disk), then the quality of service policy of the quality of service policy object is enforced upon the operation using the quality of service workload object. Otherwise, if the target block range is outside the block range of the virtual disk (e.g., the operation is directed to other data than the virtual disk), then the quality of service policy is not enforced upon the operation. Furthermore, the quality of service workload object can be used to monitor performance of the virtual disk, such as latency of processing operations. Additionally, the quality of service policy can be applied to multiple virtual disks, such as a set of virtual disks of a virtual machine. Thus, the quality of service policy can also be applied at a virtual machine granularity.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be create by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138.

During synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SMVs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements, which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
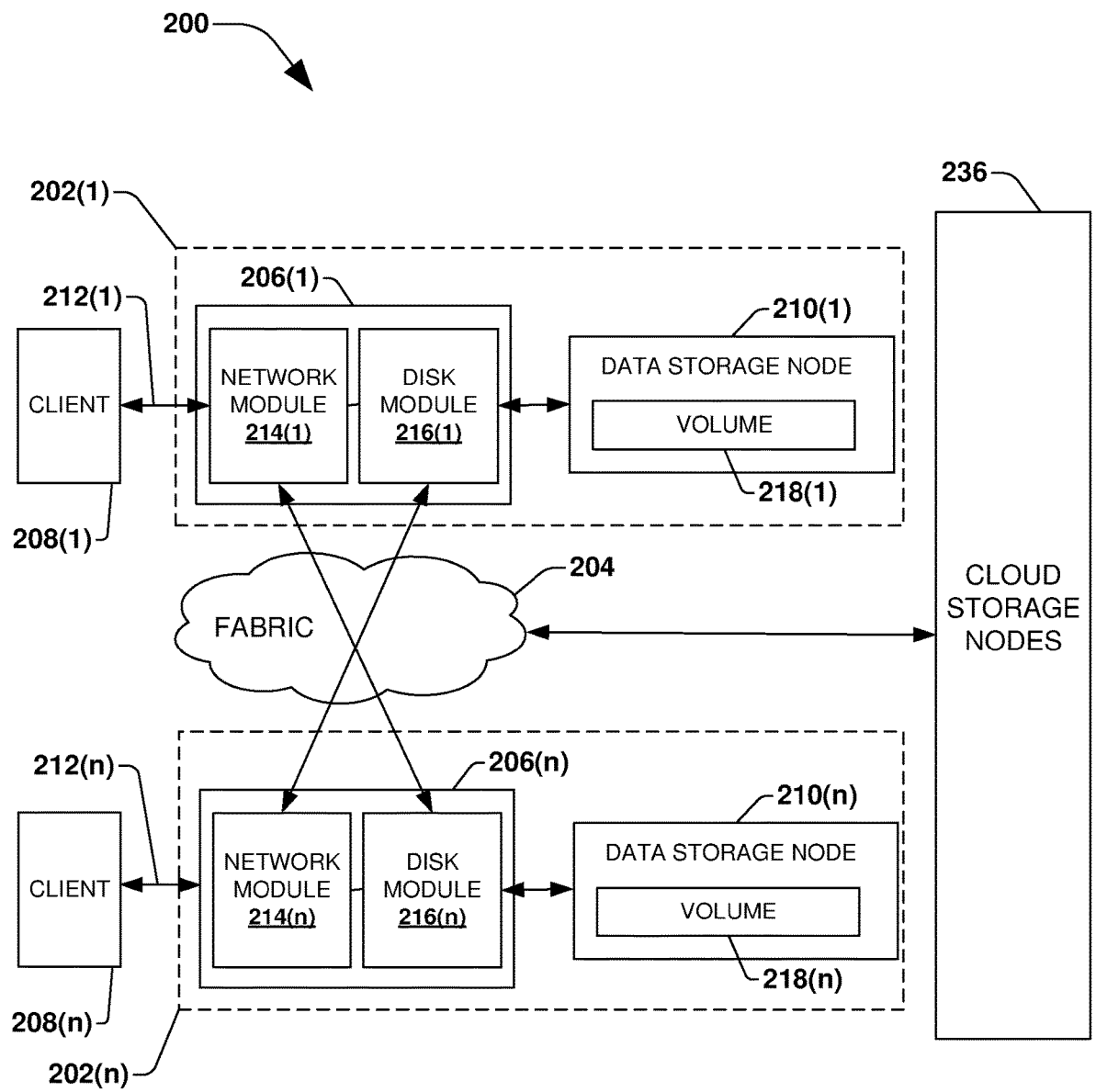
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236. The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n). The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(2), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(2) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
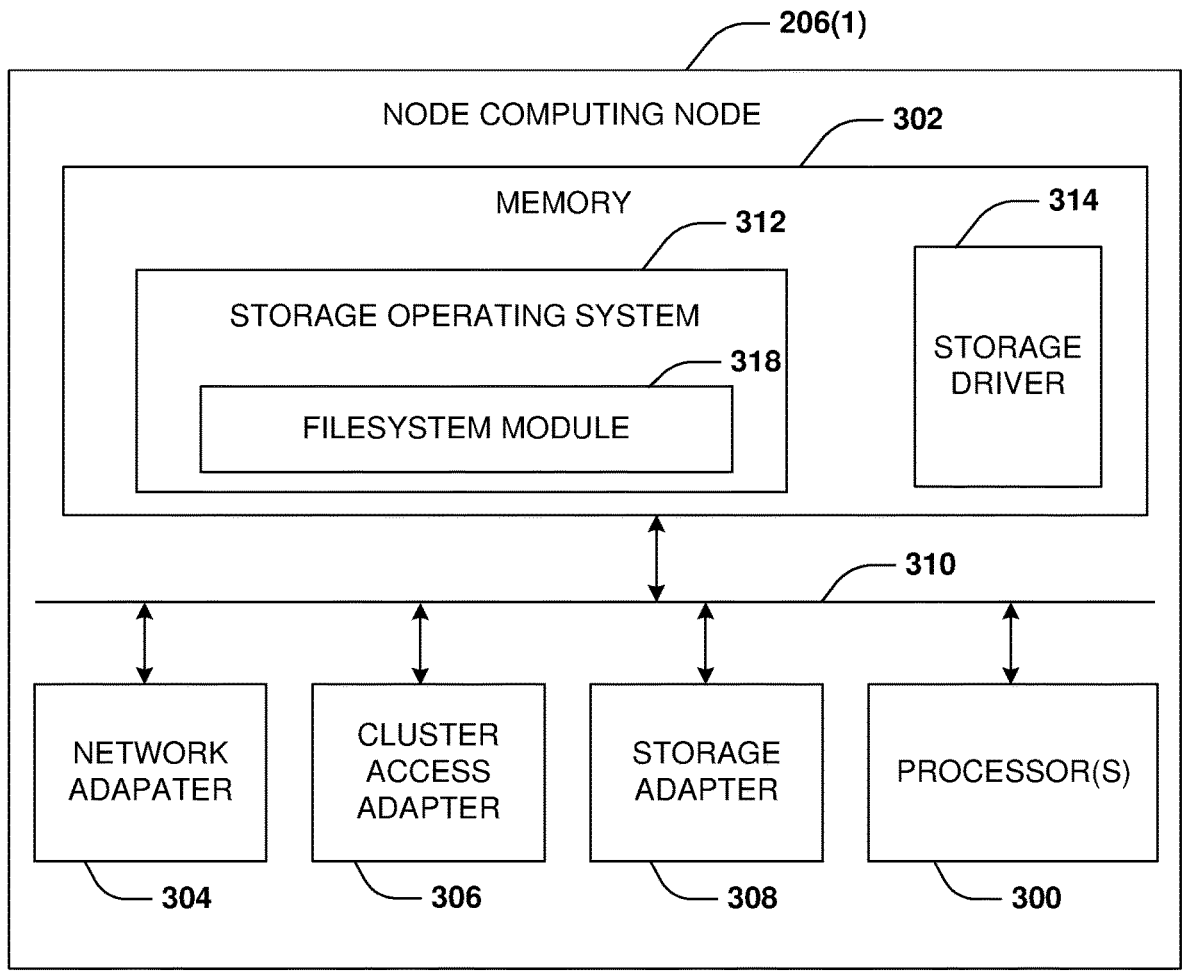
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
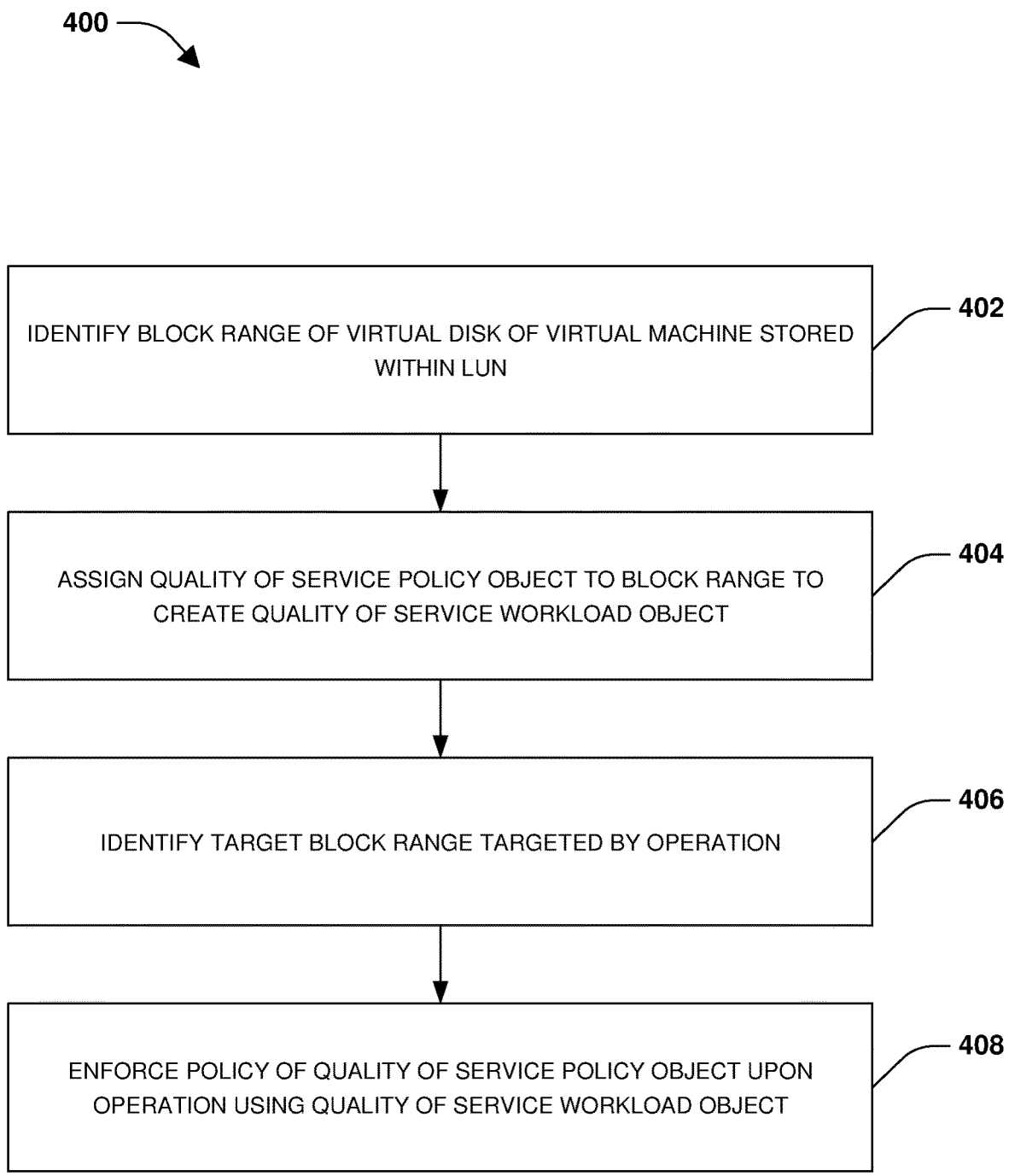
FIG. 4 is a flow chart illustrating an example method for policy enforcement at sub-lun granularity.
Figure 5:
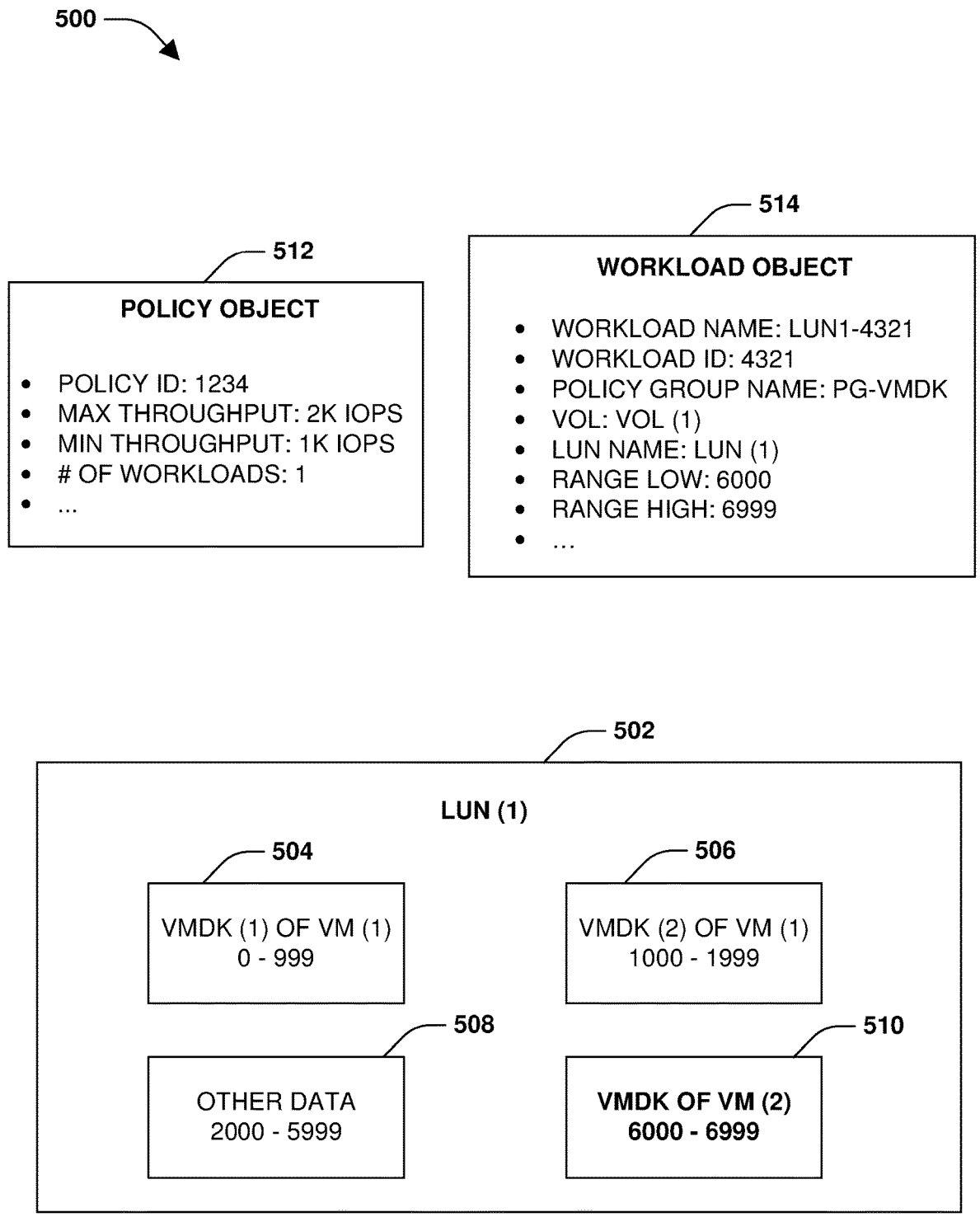
FIG. 5 is a block diagram illustrating an example system for policy enforcement at sub-lun granularity, where a policy is enforced at a virtual disk granularity.
Figure 6:
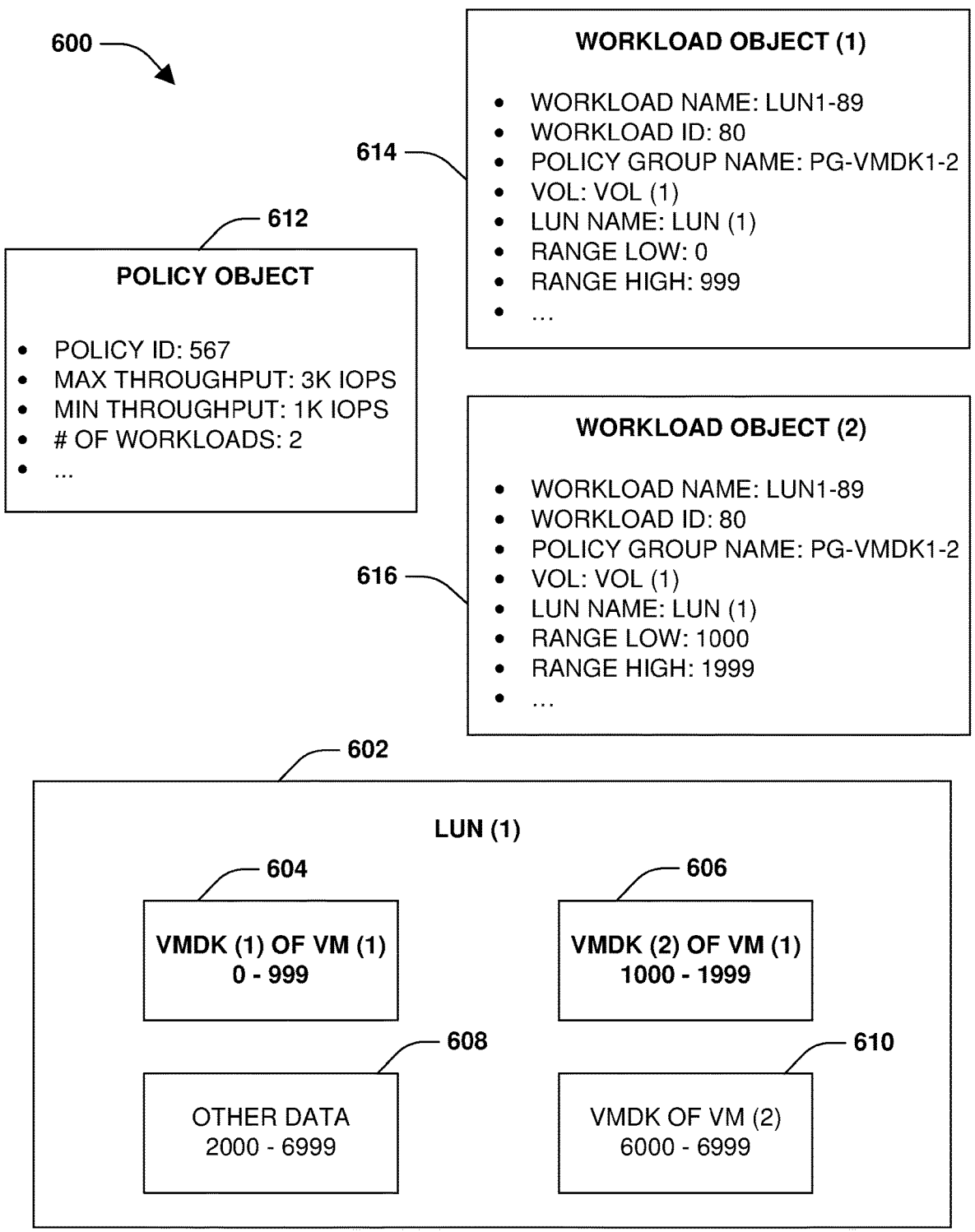
FIG. 6 is a block diagram illustrating an example system for policy enforcement at sub-lun granularity, where a policy is enforced at a virtual machine granularity.

One embodiment of policy enforcement at sub-lun granularity is illustrated by an exemplary method 400 of FIG. 4 and further described in conjunction with system 500 of FIG. 5 and/or system 600 of FIG. 6. A storage service may comprise a node hosting a storage operating system that stores data within one or more storage devices. The storage service may implement a separate virtualization environment (e.g., a hypervisor, a server virtualization platform, etc.) to host one or more virtual machines that store data within the storage devices managed by the storage service. The virtualization environment may create one or more LUNs, such as a first LUN 502, within the storage managed by the storage service. In an example, the virtualization environment may create a file system used to store data of virtual machines, such as virtual machine disks, within the first LUN 502. For example, the virtualization environment may host a first virtual machine that stores data within a first virtual disk and a second virtual disk within the first LUN 502. The virtualization environment may host a second virtual machine that stores data within a virtual disk within the first LUN 502. It may be appreciated that the virtualization environment may store any number of virtual disks of virtual machines within the first LUN 502 and/or other LUNs stored within the storage managed by the storage service. Such virtual machines may be hosted on behalf of clients of the storage service that subscribe to varying levels of quality of service policies (e.g., a gold/high level of service, a silver/medium level of service, a bronze/standard level of service, etc.).

A request may be received for a particular quality of service to provide for the virtual machine disk of the second virtual machine. The quality of service may specify a minimum throughput of 1,000 operations per second, a maximum throughput of 2,000 operations per second, and/or other resource and performance guarantees that are to be provided by the storage service for the virtual machine disk of the second virtual machine. Accordingly, at 402, a block range 510 of the virtual disk of the second virtual machine within the first LUN 502 is identified. For example, the storage service may transmit a request to a management tier of the virtualization environment for the block range 510 of the virtual disk of the second virtual machine. The management tier of the virtualization environment may return the block range 510 of 6000 to 6999 at which the virtual disk of the second virtual machine is stored within the first LUN 502 by a file system managed by the virtualization environment. In an example, a virtual storage console can be used to plug into a management tier of the virtualization environment (e.g., a middle tier) to obtain and provide the block range 510 of 6000 to 6999 to the storage service.

At 404, a quality of service policy object 512 is assigned to the block range 510 of 6000 to 6999 of the virtual disk to create a quality of service workload object 514. For example, a quality of service policy may be created based upon the request, thus resulting in the quality of service policy object 512 having the minimum throughput of 1,000 operations per second, the maximum throughput of 2,000 operations per second, a policy identifier of the quality of service policy, and a number of workload objects utilizing the quality of service policy object 512 (e.g., the number of workload objects may be incremented as the quality of service policy is assigned to block ranges of different virtual disks). In an example, the first LUN 502 may be assigned to the quality of service policy to create the quality of service policy object 512. During the assignment, the block range 510 of 6000 to 6999 of the virtual disk is specified as optional input for assigning the first LUN 502 to the quality of service policy so that the quality of service policy will be applied to merely the block range 510 of 6000 to 6999 and/or other specified block ranges of the first LUN 502. Thus, the quality of service policy will be applied to merely those specified block ranges as opposed to the entire first LUN 502.

In an example, the quality of service workload object 514 is created based upon an assignment of the block range 510 of 6000 to 6999 to the quality of service policy represented by the quality of service policy object 512. If other block ranges (e.g., other virtual disks within the first LUN 502) are assigned to the quality of service policy object 512, then additional quality of service workload objects would be created and the number of workload objects utilizing the quality of service policy object 512 would be incremented accordingly within the quality of service policy object 512. The quality of service workload object 514 may specify a workload name, a workload identifier, a policy group name, a volume name, a LUN name of the first LUN 502, a range low value of 6000 corresponding to the low value of the block range 510 of the virtual disk, a range high value of 6999 corresponding to the high value of the block range 510 of the virtual disk, and/or other information.

In an example, the quality of service policy comprises an adaptive quality of service policy. The adaptively quality of service policy may be dynamically modified based upon real-time operation and performance monitoring of the virtual disk, the virtual machine, etc. In this way, the quality of service policy object 512 may be dynamically modified, such as where additional quality of service metrics are added, quality of service metrics are removed, existing quality of service metrics are modified (e.g., the maximum throughput may be modified from 2000 to 2500), etc.

Because merely the block range 510 is assigned to the quality of service policy, the quality of service policy is not assigned to other block ranges within the first LUN 502. For example, a block range 504 of 0 to 999 within the first LUN 502 may correspond to the first virtual disk of the first virtual machine. If the quality of service policy is not to be enforced for the first virtual disk of the first virtual machine, then no quality of service workload object is created to enforce the quality of service policy for the block range 504 of 0 to 999. A block range 506 of 1000 to 1999 within the first LUN 502 may correspond to a second virtual disk of the first virtual machine. If the quality of service policy is not to be enforced for the second virtual disk of the first virtual machine, then no quality of service workload object is created to for enforcing the quality of service policy for the block range 506 of 1000 to 1999. A block range 508 of 2000 to 5999 within the first LUN may correspond to other data than virtual disks. If the quality of service policy is not to be enforced for the other data, then no quality of service workload object is created to for enforcing the quality of service policy for the block range 508 of 2000 to 5999.

At 406, an operation (e.g., a write operation, a read operation, etc.) is received by the storage service, such as by the storage operating system of the node (e.g., a data plane managed by the storage service). The operation may be evaluated to identify the first LUN 502 and a target block range targeted by the operation. For example, a command descriptor block may specify a logical block address being accessed by the operation as the target block range.

In an example, a workload lookup using a LUN identifier (e.g., a LUN identifier/name of the first LUN 502 being accessed by the operation) specified by the operation may be performed to identify the quality of service workload object 514 as corresponding to the LUN identifier (e.g., the LUN name of the first LUN 502) and to determine that the target block range (e.g., a start logical block address of the operation) is within the block range 510 of the virtual disk specified by the range low value of 6000 and the range high value of 6999 within the quality of service workload object 514. A workload to policy lookup is then performed to identify the quality of service policy object 512 as being assigned/mapped to the quality of service workload object 514. In this way, the quality of service policy is identified to apply to the operation because the operation targets the virtual disk for which the quality of service policy is to be enforced.

At 408, the quality of service policy is enforced upon the operation based upon the operation targeting the target block range within the block range 510 of 6000 to 6999 of the virtual disk to which the quality of service policy is assigned through the quality of service workload object 514.

In an example, a second operation may be received. The second operation may target a second target block range within the block range 506 of 1000 to 1999 of the second virtual disk of the first virtual machine. A workload lookup using the LUN identifier of the first LUN 502 specified by the operation and the second target block range may indicate that there is no quality of service workload object associated with the second block range targeted by the second operation (e.g., because there is no quality of service policy assigned to the block range 506 of 1000 to 1999 of the second virtual disk). In this way, no quality of service policy is enforced upon the second operation.

Various operations and performance monitoring can be provided for the virtual disk of the second virtual machine using the quality of service workload object 514 and the quality of service policy object 512. In an example, performance of the virtual disk of the second virtual machine can be monitored using the quality of service workload object 514 for the block range 510 of 6000 to 6999 of the virtual disk. Various performance metrics may be tracked such as a round trip time of an operation being processed by the storage service. In this way, sub-LUN granularity of performance monitoring may be performed by the storage service for virtual disks and/or virtual machines hosted by the separate virtualization environment within LUNs.

In another example, a show quality of service policy command may be received. The show quality of service policy command may request information about the quality of service policy. Accordingly, the quality of service policy object 512 corresponding to the requested quality of service policy is identified. Various information, such as a policy identifier of 1234, quality of service metrics to enforce (e.g., the minimum throughout of 1000 operations per second and the maximum throughput of 2000 operations per second), the number of quality of service workload objects to which the quality of service policy object 512 is assigned, etc., may be extracted and displayed in response to the show quality of service policy command.

In another example, a show quality of service workload command may be received. The show quality of service workload command may request information about a particular quality of service workload object of a particular virtual disk (block range). Accordingly, the quality of service workload object 514 corresponding to the requested quality of service workload object is identified. Various information, such as a workload name, a workload identifier, a policy group name, a volume name, a LUN name, a block range low value, a block range high value, etc., may be extracted and displayed in response to the show quality of service workload command.

In another example, a block range delete command may be received. The block range delete command may specify a block range and an indication that the block range is to be deleted. In this way, the block range is deleted based upon the block range delete command (e.g., a quality of service workflow object for the block range is deleted and/or data stored within the block range is deleted). In another example, a block range move command is received. The block range move command may specify that a block range is to be moved from the first LUN 502 to a destination LUN (e.g., a new LUN). Accordingly, the block range is moved from the first LUN 502 to the destination LUN. LUN information within a quality of service workflow object associated with the block range being moved is updated from specifying the first LUN 502 to specifying the destination LUN. In another example, a modify command may be received. The modify command may specify a block range and a new block range. Accordingly, the block range within a quality of service workload object is modified to the new block range.

FIG. 6 illustrates a system 600 assigning and enforcing a quality of service policy at a virtual machine granularity. For example, a request may be received to assign a quality of service policy to a first virtual machine. A first virtual disk of the first virtual machine may be stored within a block range 604 of 0 to 999 within a first LUN 602 and a second virtual disk of the virtual machine may be stored within a block range 606 of 1000 to 1999 within the first LUN 602 by a virtualization environment. The first LUN 602 may comprise other data stored within a block range 608 of 2000 to 6999, a virtual disk of a second virtual machine within a block range 610 of 6000 to 6999, and/or other data within the first LUN 602.

A determination is made that the first virtual disk and the second virtual disk are used by the first virtual machine. For example, a storage service of the system 600 may obtain such information from the virtualization environment. The block range 604 of 0 to 999 within the first LUN 602 may be identified as a location where a file system of the virtualization environment has stored the first virtual disk within the first LUN 602. The block range 606 of 1000 to 1999 within the first LUN 602 may be identified as a location where the file system of the virtualization environment has stored the second virtual disk within the first LUN 602. In this way, a set of block ranges, within the first LUN 602, of virtual disks of the first virtual machine are identified.

A quality of service policy object 612 is created to represent the quality of service policy. The quality of service policy object 612 comprises a policy identifier of the quality of service policy, quality of service metrics of the quality of service policy to enforce, a number of workloads enforcing the quality of service policy upon block ranges, and/or other information. The quality of service policy is assigned to the block range 604 of 0 to 999 of the first virtual disk using the quality of service policy object 612 to create a first quality of service workload object 614 used to enforce the quality of service policy upon the first virtual disk of the first virtual machine. The first quality of service workload object 614 may comprise a workload name, a workload identifier, a policy group name, a volume name, a LUN name of the first LUN 602, a low block range of 0 indicating a starting block of the block range 604 of the first virtual disk, a high block range of 999 indicating an ending block of the block range 604 of the first virtual disk, and/or other information.

The quality of service policy is assigned to the block range 606 of 1000 to 1999 of the second virtual disk using the quality of service policy object 612 to create a second quality of service workload object 616 used to enforce the quality of service policy upon the second virtual disk of the first virtual machine. The second quality of service workload object 616 may comprise a workload name, a workload identifier, a policy group name, a volume name, a LUN name of the first LUN 602, a low block range of 1000 indicating a starting block of the block range 606 of the second virtual disk, a high block range of 1999 indicating an ending block of the block range 606 of the second virtual disk, and/or other information.

The first quality of service workload object 614 is used to enforce the quality of service policy upon operations targeting blocks within the block range 604 of 0 to 999 of the first virtual disk. The second quality of service workload object 616 is used to enforce the quality of service policy upon operations targeting blocks of the first LUN 602 within the block range 606 of 1000 to 1999 of the second virtual disk. In this way, the quality of service policy is enforced by the storage service for the virtual disks of the virtual machine notwithstanding the virtual disks being managed by a separate virtualization environment.

According to a further aspect of the present disclosure, an apparatus/machine/system for policy enforcement and performance monitoring at a sub-LUN granularity comprises a means for identifying a block range of a virtual disk of a virtual machine stored within a logical unit number (LUN), a means for assigning a quality of service (QoS) policy object to the block range to create a QoS workload object, a means for identifying a target block range targeted by an operation, and a means for enforcing a policy of the QoS policy object upon the operation using the QoS workload object based upon the target block range being within the block range of the virtual disk.

Figure 7:
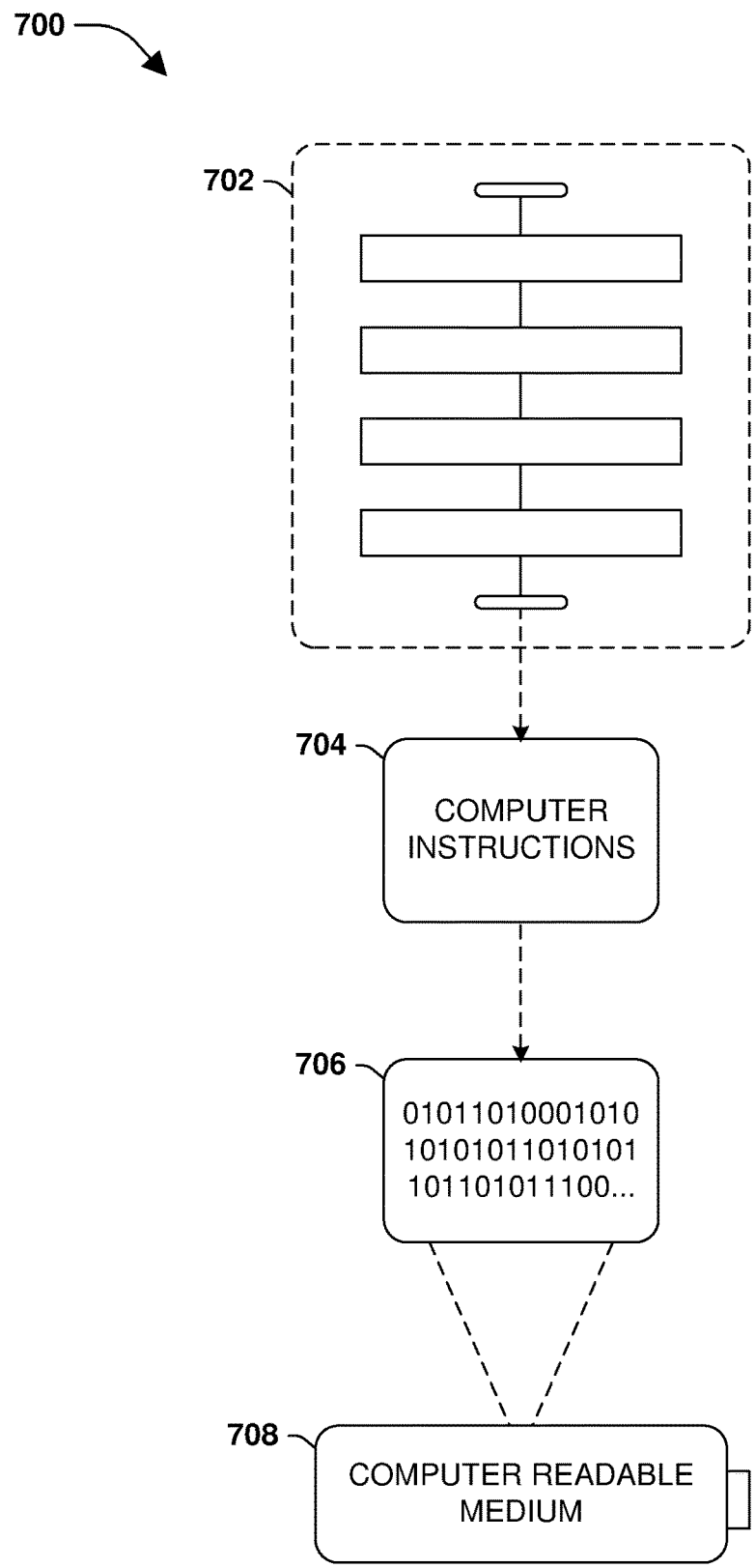
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises a processor-executable computer instructions 704 configured to operate according to one or more of the principles set forth herein. In some embodiments, the processor-executable computer instructions 704 are configured to perform a method 702, such as at least some of the exemplary method 400 of FIG. 4, for example. In some embodiments, the processor-executable computer instructions 704 are configured to implement a system, such as at least some of the exemplary system 500 of FIG. 5 and/or at least some of the exemplary system 60 of FIG. 6, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    hosting, through a virtualization environment lacking native functionality for providing quality of service guarantees and monitoring, a plurality of virtual machines, wherein virtual disks of the plurality of virtual machines are stored through a file system over a logical unit number (LUN) at block ranges according to a sub-LUN granularity;
    identifying, by a service external to the virtualization environment, the block ranges of the LUN storing the virtual disks according to the sub-LUN granularity;

creating, by the service, a quality of service (QoS) policy object defining a policy to apply at the sub-LUN granularity to block ranges assigned to the QoS policy object, wherein QoS workload objects are defined through the QoS policy object for each block range assigned to the QoS policy object, and wherein a QoS workload object is created for a block range of a virtual disk to provide the quality of service guarantees and monitoring at the sub-LUN granularity for the virtual disk and excluding other virtual disks stored at block ranges not assigned to the QoS policy object;

performing a workload lookup for the QoS workload objects using the block range targeted by an operation to identify the QoS workload object defined for the block range; and in response to a workload to policy lookup determining that the QoS workload object is mapped to the QoS policy object, enforcing, by the service, the policy of the QoS policy object upon the operation using the QoS workload object.

2. The method of claim 1, comprising:
refraining from enforcing the policy of the QoS policy object upon a second operation based upon the second operation targeting blocks within the LUN that are outside of the block ranges assigned to the QoS policy object.

3. The method of claim 1, comprising:
monitoring performance of the virtual disk using the QoS workload object based upon execution of operations targeting the block range.

4. The method of claim 1, comprising:
assigning the QoS policy object to a second block range of a second virtual disk to create a second QoS workload object mapped to the QoS policy object for the second block range.

5. The method of claim 4, comprising:
enforcing the policy of the QoS policy object upon a second operation targeting the second block range.

6. The method of claim 1, comprising:
modifying the block range within the QoS workload object to a new block range based upon a modify command modifying the block range to be the new block range.

7. The method of claim 1, comprising:
moving the block range from the LUN to a destination LUN, wherein the QoS workload object is modified with information regarding the destination LUN.

8. The method of claim 1, comprising:
identifying a set of block ranges, within the LUN, of virtual disks of the virtual machine and assigning the QoS policy object to the set of block ranges to create a set of workload objects used to enforce the policy of the QoS policy object upon operations targeting blocks within the set of block ranges.

9. The method of claim 1, wherein the block range is a non-continuous block range.

10. The method of claim 1, wherein the policy comprises an adaptive QoS policy, and the method comprises:
modifying the adaptive QoS policy of the QoS policy object to modify the QoS policy object.

11. The method of claim 1, wherein the block range is a continuous block range.

12. A non-transitory machine readable medium comprising instructions for performing a method, which when executed by a machine, causes the machine to:
host, through a virtualization environment lacking native functionality for providing quality of service guarantees and monitoring, a plurality of virtual machines, wherein virtual disks of the plurality of virtual machines are stored through a file system over a logical unit number (LUN) at block ranges according a sub-LUN granularity;

identify, by a service external to the virtualization environment, the block ranges of the LUN storing the virtual disks according to the sub-LUN granularity;

create, by the service, a quality of service (QoS) policy object defining a service policy to apply at the sub-LUN granularity to block ranges assigned to the QoS policy object, wherein QoS workload objects are defined through the QoS policy object for each block range assigned to the QoS policy object, and wherein a QoS workload object is created for a block range of a virtual disk to provide the quality of service guarantees and monitoring at the sub-LUN granularity for the virtual disk and excluding other virtual disks stored at block ranges not assigned to the QoS policy object;

perform a workload lookup for the QoS workload objects using the block range targeted by an operation to identify the QoS workload object defined for the block range; and in response to a workload to policy lookup determining that the QoS workload object is mapped to the QoS policy object, enforce, by the service, the service policy of the QoS policy object upon the operation using the QoS workload object.

13. The non-transitory machine readable medium of claim 12, wherein the instructions cause the machine to:
create the QoS workload object based upon an assignment of the block range of the virtual disk to the policy of the QoS policy object.

14. The non-transitory machine readable medium of claim 12, wherein the instructions cause the machine to:
assign the LUN to the policy to create the QoS policy object, wherein the block range is specified as optional input for assigning the LUN to the policy.

15. The non-transitory machine readable medium of claim 12, wherein the instructions cause the machine to:
implement a show QoS workload command to display a workload name, a workload identifier, a policy group name, a LUN name, a low block range value, and a high block range value of the QoS workload object.

16. The non-transitory machine readable medium of claim 12, wherein the instructions cause the machine to:
implement a show QoS policy command to display an identifier, QoS metrics to enforce, and a number of QoS workload objects to which the QoS policy object is assigned.

17. The non-transitory machine readable medium of claim 12, wherein the instructions cause the machine to:
perform the workload lookup using a LUN identifier specified by the operation to identify the QoS workload object as corresponding to the LUN identifier and a starting logical block address associated with the operation.

18. The non-transitory machine readable medium of claim 17, wherein the instructions cause the machine to:
perform the workload to policy lookup to identify the QoS policy object as being assigned to the QoS workload object and enforce the policy of the QoS policy object upon the operation.

19. The non-transitory machine readable medium of claim 12, wherein the instructions cause the machine to:
delete the block range based upon a block range delete command.

20. A computing device comprising:

a memory comprising machine executable code for performing a method; and a processor coupled to the memory, the processor configured to execute the machine executable code to cause the processor to:

host, through a virtualization environment lacking native functionality for providing quality of service guarantees and monitoring, a plurality of virtual machines, wherein virtual disks of the plurality of virtual machines are stored through a file system over a logical unit number (LUN) at block ranges according a sub-LUN granularity;

identify, by a service external to the virtualization environment, the block ranges of the LUN storing the virtual disks according to the sub-LUN granularity;

create, by the service, a quality of service (QoS) policy object defining a service policy to apply at the sub-LUN granularity to block ranges assigned to the QoS policy object, wherein QoS workload objects are defined through the QoS policy object for each block range assigned to the QoS policy object, and wherein a QoS workload object is created for a block range of a virtual disk to provide the quality of service guarantees and monitoring at the sub-LUN granularity for the virtual disk and excluding other virtual disks stored at block ranges not assigned to the QoS policy object;

perform a workload lookup for the QoS workload objects using the block range targeted by an operation to identify the QoS workload object defined for the block range; and in response to a workload to policy lookup determining that the QoS workload object is mapped to the QoS policy object, enforce, by the service, the service policy of the QoS policy object upon the operation using the QoS workload object.

\* \* \* \* \*